United States Patent
Sharma et al.

(10) Patent No.: US 11,140,591 B2
(45) Date of Patent: Oct. 5, 2021

(54) MOBILE COMMUNICATIONS NETWORK, COMMUNICATIONS DEVICE, INFRASTRUCTURE EQUIPMENT AND METHODS

(71) Applicant: Sony Corporation, Tokyo (JP)

(72) Inventors: Vivek Sharma, Basingstoke (GB); Brian Alexander Martin, Basingstoke (GB); Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/610,527

(22) PCT Filed: Apr. 26, 2018

(86) PCT No.: PCT/EP2018/060721
§ 371 (c)(1),
(2) Date: Nov. 4, 2019

(87) PCT Pub. No.: WO2018/202539
PCT Pub. Date: Nov. 8, 2018

(65) Prior Publication Data
US 2020/0092774 A1 Mar. 19, 2020

(30) Foreign Application Priority Data
May 5, 2017 (EP) .................................... 17169819

(51) Int. Cl.
*H04W 36/00* (2009.01)
*H04W 88/10* (2009.01)
*H04W 92/20* (2009.01)

(52) U.S. Cl.
CPC ...... *H04W 36/00835* (2018.08); *H04W 88/10* (2013.01); *H04W 92/20* (2013.01)

(58) Field of Classification Search
CPC ..... H04W 48/18; H04W 36/08; H04W 36/00; H04W 36/0022; H04W 36/0061;
(Continued)

(56) References Cited

U.S. PATENT DOCUMENTS

| 2015/0119047 A1* | 4/2015 | Macias | H04W 36/165 455/444 |
| 2019/0159088 A1* | 5/2019 | Shi | H04W 36/08 |

(Continued)

OTHER PUBLICATIONS

International Search Report and Written Opinion dated Jul. 30, 2018 for PCT/EP2018/060721 filed on Apr. 26, 2018, 19 pages.
(Continued)

*Primary Examiner* — Quoc Thai N Vu
(74) *Attorney, Agent, or Firm* — Xsensus LLP

(57) ABSTRACT

Methods are provided for communicating in a mobile network, the mobile network comprising a plurality of infrastructure equipment, each providing wireless connectivity within at least one cell, and a device configured to communicate wirelessly with at least a first of the infrastructure equipment in control of a first cell. In some embodiments, the method comprises determining, at the device, whether a second cell under control of a second of the infrastructure equipment is connected to a first core network operating in accordance with a first protocol or both of the first core network and a second core network operating in accordance with a second protocol, and transmitting, by the device, an automatic neighbor relation report to the first infrastructure equipment, a report comprising an indication of whether the second cell is connected to the first core network or both of the first core network and the second core network.

9 Claims, 8 Drawing Sheets

(58) Field of Classification Search
CPC ........... H04W 36/00835; H04W 88/08; H04W 88/10; H04W 76/16; H04W 92/20
See application file for complete search history.

(56) References Cited

U.S. PATENT DOCUMENTS

2019/0297550 A1* 9/2019 Zhang .................. H04W 36/14
2019/0342804 A1* 11/2019 Futaki .................. H04W 36/14

OTHER PUBLICATIONS

ZTE, "TS 23.501 P-CR Modification on the migration," SA WG2 Meeting No. 119, S2-171094, Dubrovnik, Croatia, Feb. 13-17, 2017, 3 pages.
Ericsson, "CN selection when accessing," 3GPP TSG-RAN WG2 No. 97bis, R2-1702561, Spokane, USA, Apr. 3-7, 2017, 3 pages.
ZTE, "ANRF for NR," 3GPP TSG RAN WG3 Meeting No. 95bis, R3-171015, Spokane, USA, Apr. 3-7, 2017, 3 pages.
Oppo, "Discussion on ANR Functionality for eLTE," 3GPP TSG-RAN WG2 No. 99bis, R2-1710183, Prague, Czech Republic, Oct. 9-13, 2017, pp. 3 pages.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2", Release 10, 3GPP TS 36.300 V10.0.0, Jun. 2010.
Huawei, et al., "Coexistence between NR and LTE", 3GPP TSG RAN WG1 Meeting No. 87, R1-1611681, Reno, USA, Nov. 14-18, 2016, 6 pages.
Qualcomm Inc., "New Work Item: NarrowBand IOT (NB-IOT)", 3GPP TSG RAN Meeting No. 69, RP-151621, Phoenix, USA, Sep. 14-16, 2015, 8 pages.
NTT DOCOMO, "New SID Proposal: Study on New Radio Access Technology", 3GPP TSG RAN Meeting No. 71, RP-160671, Göteborg, Sweden, Mar. 7-10, 2016, 8 pages.
Huawei, et al., "New Work item on LTE connectivity to 5G-CN", 3GPP TSG RAN Meeting No. 75, RP-170840, Dubrovnik, Croatia, Mar. 6-9, 2017, 7 pages.
Holma, H. et al., "LTE for UMTS: OFDMA and SC-FDMA Based Radio Access", System Architecture Based 3GPP SAE, John Wiley & Sons, Ltd., 2009, 8 pages.

* cited by examiner

MOBILE COMMUNICATIONS NETWORK, COMMUNICATIONS DEVICE, INFRASTRUCTURE EQUIPMENT AND METHODS

CROSS-REFERENCE TO RELATED APPLICATIONS

The present application is based on PCT filing PCT/EP2018/060721, filed Apr. 26, 2018, which claims priority to EP 17169819.4, filed May 5, 2017, the entire contents of each are incorporated herein by reference.

BACKGROUND

Field of Disclosure

The present disclosure relates to mobile communications networks comprising infrastructure equipment and communications devices, and specifically provides methods for which source cells may determine which core networks are supported by target cells for handover.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new opportunities as well as challenges. One such challenge is how initially deploy new RAT systems, particularly when LTE systems will still be widespread.

SUMMARY OF THE DISCLOSURE

Embodiments of the present technique can provide methods which relate to communicating in a mobile communications network, the mobile communications network comprising a plurality of infrastructure equipment, each providing wireless connectivity within at least one cell, and a communications device configured to communicate wirelessly with at least a first of the infrastructure equipment in control of a first cell.

In some embodiments, the method comprises determining, at the communications device, whether a second cell under control of a second of the infrastructure equipment is connected to a first core network operating in accordance with a first communications protocol or both of the first core network and a second core network operating in accordance with a second communications protocol, the second cell being a neighbour of the first cell, and transmitting, by the communications device, an automatic neighbour relation report to the first infrastructure equipment, the automatic neighbour relation report comprising an indication of whether the second cell is connected to the first core network or both of the first core network and the second core network.

In some embodiments, the method comprises transmitting, by the first infrastructure equipment, a connection setup request message, to a second of the infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Embodiments of the present technique, which further relate to mobile communications networks, communications devices, infrastructure equipment, methods of operating communications devices, and methods of operating infrastructure equipment, may provide ways in which source cells may determine whether target cells for handover support connection to the NR core network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

LTE Technology (4G)

Figure 1:
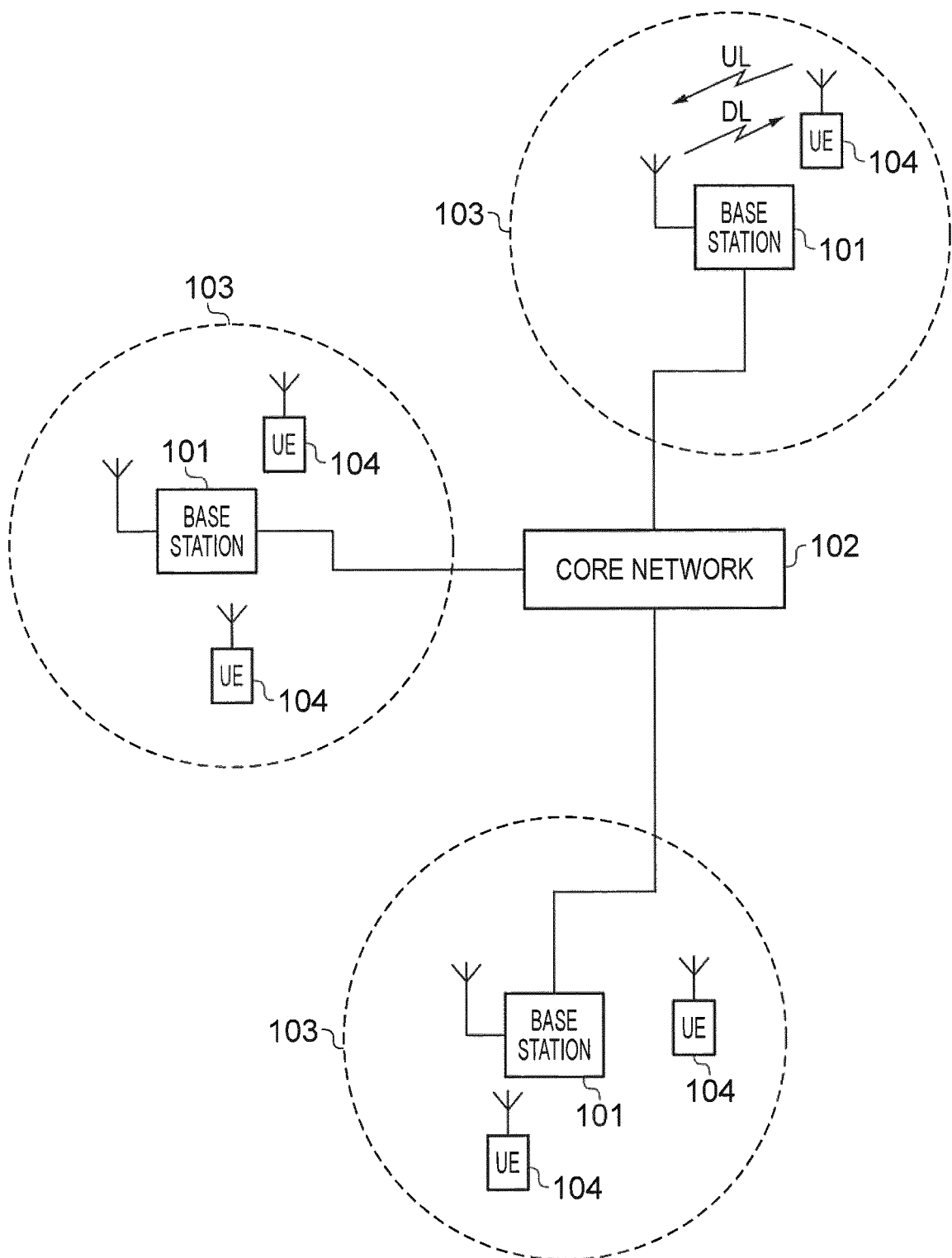
FIG. 1 is a schematic block diagram of a first wireless communications system with architectural components corresponding to that of a conventional LTE-based network.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1].

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [2] to develop a new RAT for the next generation wireless communication system, i.e. 5G, and in 3GPP a Study Item (SI) on NR has been agreed [3] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 2:
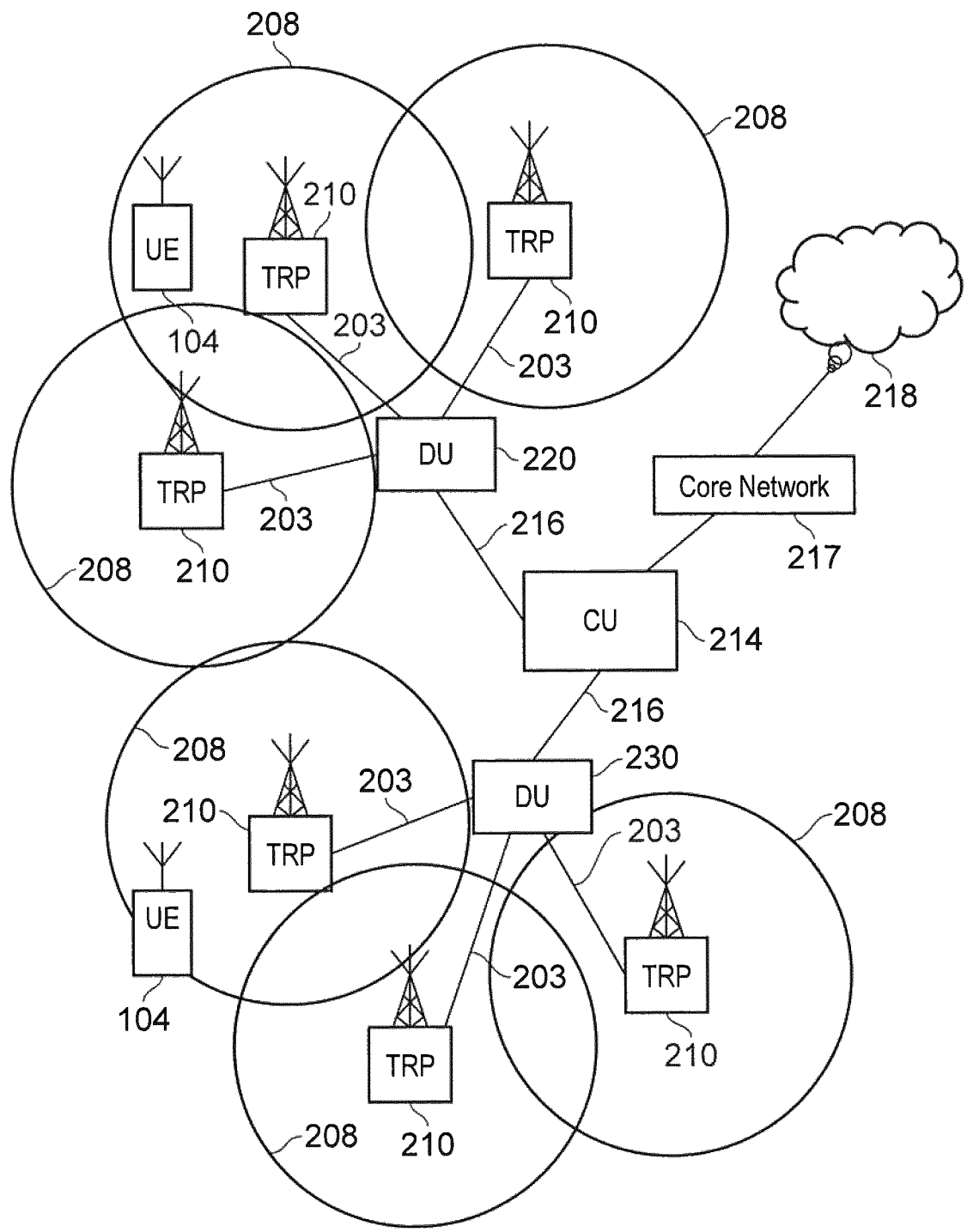
FIG. 2 is a schematic block diagram of a second wireless communications system with architectural components corresponding to that of an example enhanced new radio (NR) or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for NR and 5G is shown in FIG. 2. In FIG. 2 a plurality of transmission and reception points (TRP) 210 are connected to distributed control units (DU) 220, 230 by a connection interface represented as a line 203. Each of the transmitter receiver points (TRP) 210 is arranged to transmit and receive signals via a wireless access interface within a radio frequency bandwidth available to the wireless communications network. Thus within a range for performing radio communications via the wireless access interface, each of the TRP 210, forms a cell of the wireless communications network as represented by a dashed line 208. As such wireless communications devices 104 which are within a radio communications range provided by the cells 210 can transmit and receive signals to and from the TRP 210 via the wireless access interface. Each of the distributed control units 220, 230 are connected to a co-ordinating unit (CU) 214 via an interface 216. The CU 214 is then connected to the a core network 217 which may contain all other functions required for communicating data to and from the wireless communications devices and the core network 217 may be connected to other networks 218.

The elements of the wireless access network shown in FIG. 2 may operate in a similar way to corresponding elements of an LTE network such as that shown in FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB 101 of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 104 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Coexistence Between NR and LTE

Figure 3:
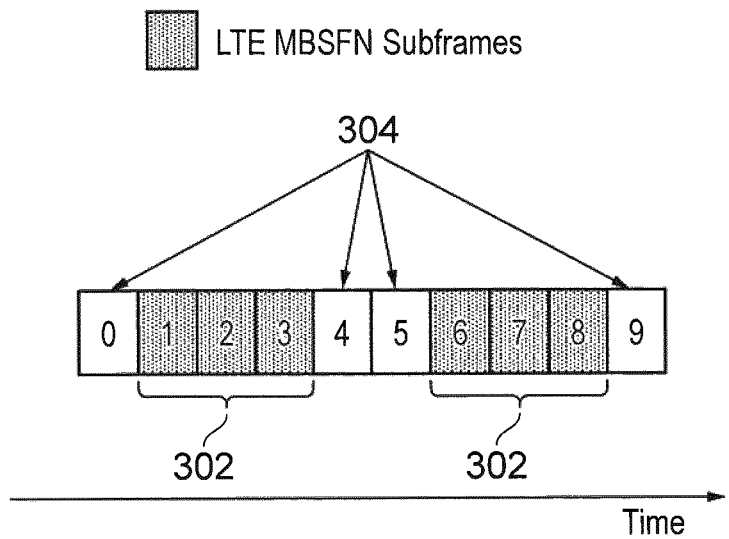
FIG. 3 shows an example of how LTE and NR transmissions may be differentiated between using time division multiplexing (TDM)
Figure 4:
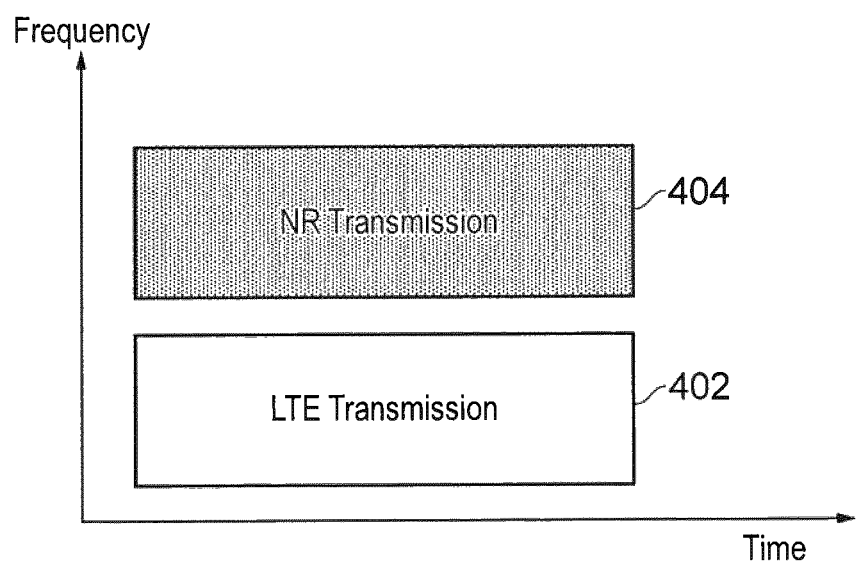
FIG. 4 shows an example of how LTE and NR transmissions may be differentiated between using frequency division multiplexing (FDM)

At least for initial deployment, NR and LTE are expected to coexist. Coexistence can be implemented using the same frequency resources but NR and LTE are differentiated using time division multiplexing (TDM). For example, NR may use LTE multicast-broadcast single frequency network (MBSFN) subframes, where there are up to a maximum of six LTE MBSFN subframes in each radio frame, as shown in FIG. 3. As shown in FIG. 3, six LTE MBSFN subframes 302 (subframes 1, 2, 3, 6, 7, 8) are used for NR transmissions, and the remaining subframes 304 are used for LTE transmissions. Another implementation is to use separate frequency resources and implement NR as a secondary carrier in a multi-carrier operation. Here, LTE uses one frequency carrier 402 and NR uses another frequency carrier 404 as shown in FIG. 4.

It will be appreciated that an MBSFN subframe consists of an LTE control region and a blank region. The LTE control region contains LTE control channels (e.g. physical downlink control channel (PDCCH), physical hybrid-ARQ indicator channel (PHICH)) and cell-specific reference signals (CRS). The blank region is not modulated. The reason for having an LTE control channel region in the MBSFN subframe is to allow the gNodeB to signal to the UE the following:

PHICH provides ACK/NACK information related to previous uplink transmissions from the UE.

PDCCH is used for indicating uplink allocations to the UE. The gNodeB signals a PDCCH to the UE to assign a physical uplink shared channel (PUSCH) in a future subframe. The PUSCH is transmitted in a future subframe and is not impacted by MBSFN transmissions (since PUSCH is an uplink transmission, not a downlink transmission). Note that the UE monitors for "PDCCH indicating uplink allocations" by performing blind decoding for downlink control information (DCI) format 0 or DCI format 4.

PDCCH for indicating transmit power control commands to the UE. Note that the UE monitors for these by blind decoding for DCI formats 3 or 3A.

However, the LTE UE does not monitor for PDCCH indicating downlink allocations to the UE in an MBSFN subframe. In LTE, there is a rule that states that the PDCCH allocating downlink resources to the UE in subframe 'n' relates to a PDSCH in subframe 'n'. Since there is no PDSCH region in MBSFN subframes, it is evident that there is no point in the UE monitoring PDCCH for downlink allocations in MBSFN subframes. As such, the UE does not need to blind decode for DCI formats 1->2C in MBSFN subframes.

Figure 5:
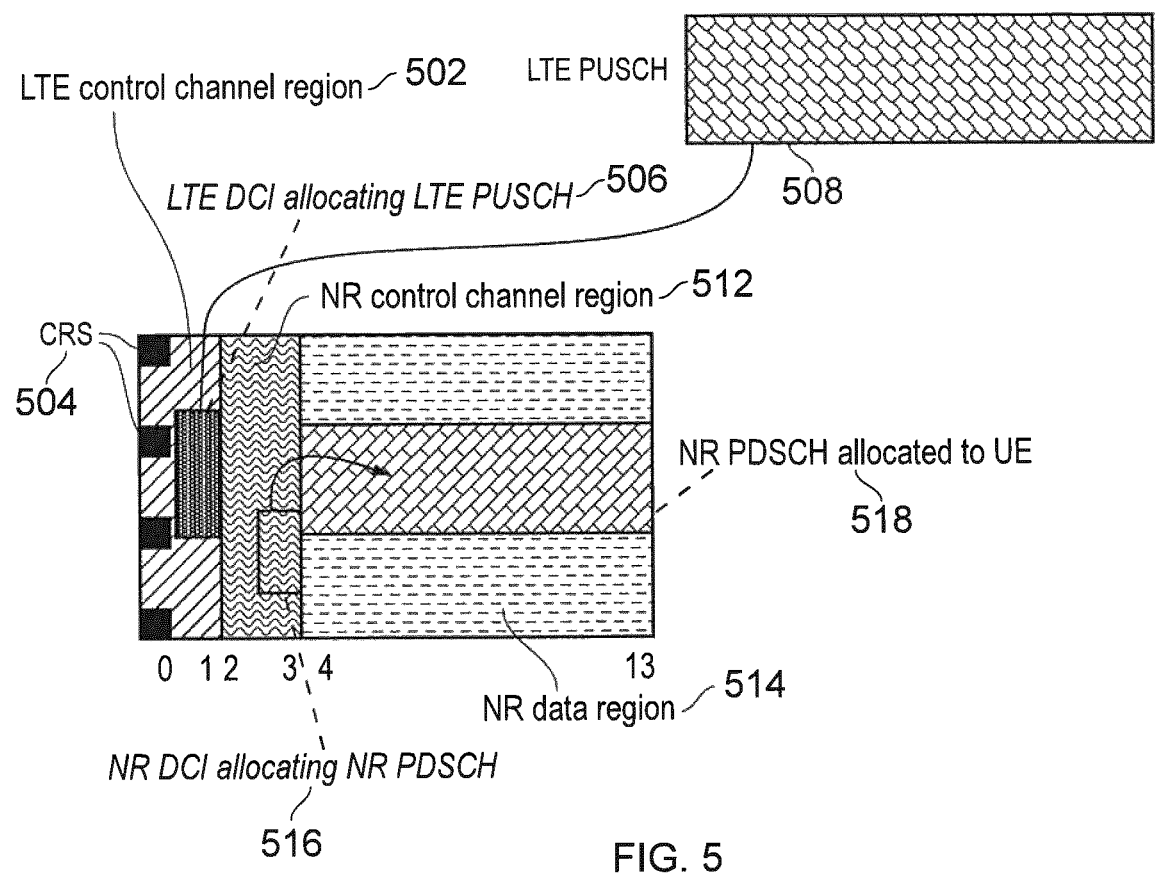
FIG. 5 shows an example of a multicast-broadcast single-frequency network (MBSFN) subframe used to support a LTE/NR coexistence.

When NR occupies an MBSFN subframe (as discussed above, for example with reference to the subframes 302 in FIG. 3), the NR transmission does not occupy the LTE control channel region. FIG. 5 shows the structure of an MBSFN subframe used to transmit NR. The subframe consists of an LTE control channel region 502 occupying OFDM symbols 0 and 1. The LTE control channel region 502 also contains LTE CRS 504. The NR region of the subframe occupies OFDM symbols 2 to 13 (where the OFDM symbol duration is defined with reference to LTE), and comprises an NR control channel region 512 and an NR data region 514. The NR region can implement a different numerology to the numerology of the LTE region. It is evident that if an NR UE is to be scheduled in an MBSFN subframe, such as the one shown in FIG. 5, there is inefficiency in that the NR control channel occupies NR resources, even though the LTE control channel may not be used to serve LTE UEs. As can be seen in FIG. 5, an LTE DCI 506 in the LTE control channel region (e.g. DCI format 0) may allocate LTE PUSCH 508 in a future subframe and an NR DCI 516 in the NR control channel region 512 allocating NR PDSCH 518 in the NR data region 514 in the same subframe.

NR-LTE coexistence may serve UEs that are only capable of LTE or only capable of NR (i.e. LTE UEs occupy LTE portions of the resource, such as subframes 304 in FIG. 3 and NR UEs occupy NR portions of the resource, such as subframes 302 in FIG. 3). It is also expected that some UEs may be both LTE and NR capable and hence some inter-working between NR and LTE would be beneficial for such UEs.

It is well understood that it is inefficient from a statistical multiplexing perspective to dedicate some fixed resource for one type of UE and dedicate some other fixed resource for another type of UE. Consider for example, the frame structure of FIG. 3. If data arrives for an LTE UE in subframe 1, that data cannot be scheduled to the LTE UE, even if there are no NR UEs active in subframe 1; the UE can only be scheduled in subframe 4, at which time there may be other LTE UEs that need to be served.

In [4] it is proposed that LTE can be further evolved to allow higher degree of adaptation/flexibility in time/frequency for enhanced NR-LTE inter-working. Embodiments of the present technique are related to methods for NR-LTE inter-working. Embodiments of the present technique are related to the concept of a master RAT, or anchor carrier. The master RAT/anchor carrier is the base RAT technology that the cell operates on. Downlink control channel signaling is carried on the master RAT. In FIG. 3, LTE is the master RAT and the NR system is inserted into the LTE frame structure. However, as would be appreciated by those skilled in the art, embodiments of the present technique could equally apply to either NR or LTE as the master RAT.

Figure 6:
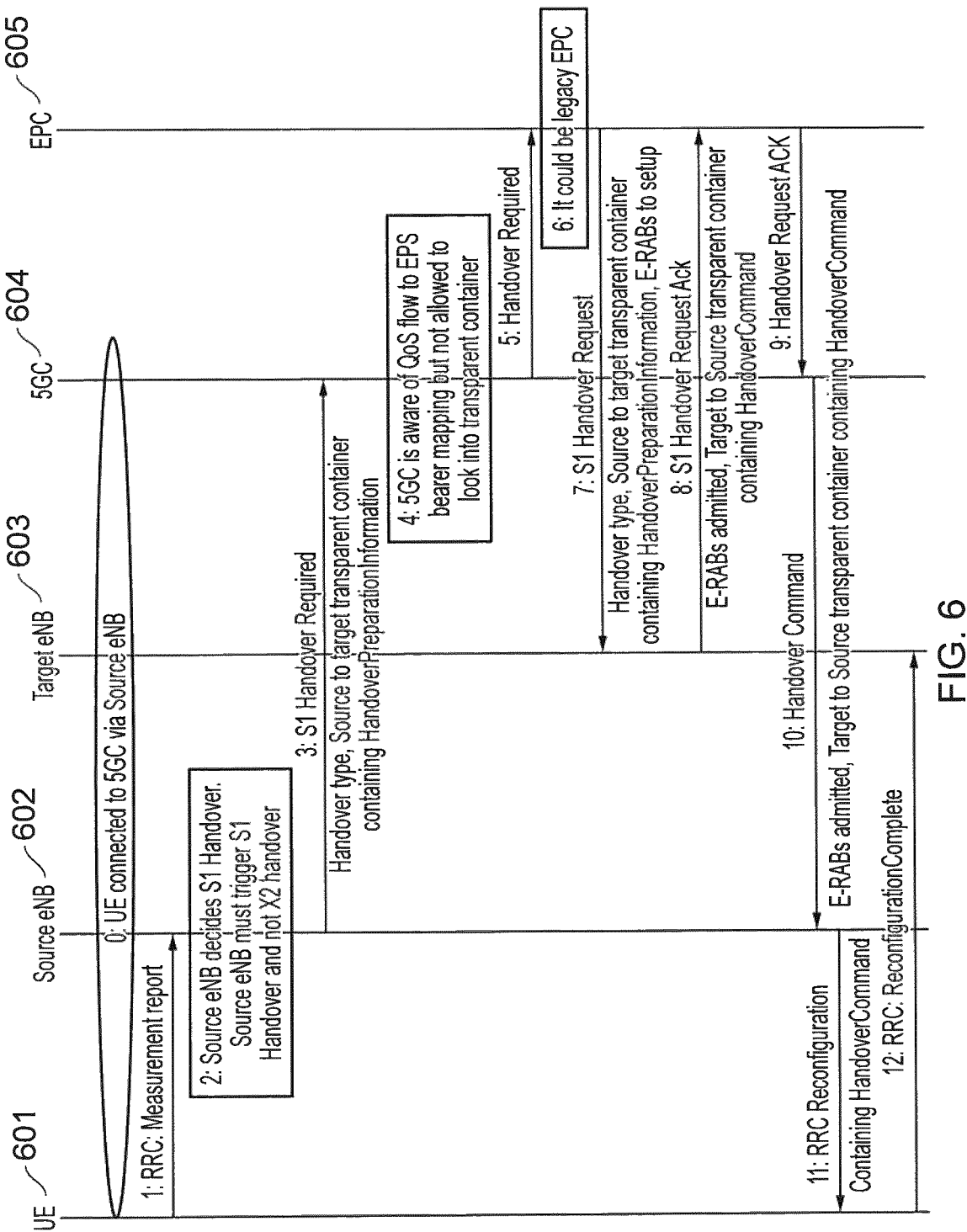
FIG. 6 illustrates an exemplary handover procedure involving two core networks.

It was proposed in [5] that handover should be supported between LTE cells connected to the Evolved Packet Core (EPC) and LTE cells connected to the 5G Core Network (5G-CN, or 5GC). FIG. 6 illustrates an exemplary handover procedure between a first (source) eNodeB 602 connected to a UE 601 and a second (target) eNodeB 603 involving two core networks; the 5GC 604 and EPC 605. In step 0, the UE 601 is connected to the source eNodeB 602, which controls an LTE cell, and to the 5GC 604. In step 1, the UE 601 sends a Radio Resource Control (RRC) measurement report to the source eNodeB 602.

In step 2, the source eNodeB 602 must have sufficient information to decide if it needs to trigger an S1 or X2 handover, the S1 interface being that between an eNodeB and a Core Network (CN), and the X2 interface being that used to interconnect eNodeBs. If the target cell controlled by the target eNodeB 603 supports connection to 5GC 604, then X2 handover can be triggered. However, in the case of FIG. 6, since a change of CN should take place, S1 handover should be triggered. The source eNodeB 602 must be aware of the target cell capability, and its connection to a CN.

Automatic Neighbour Relation (ANR) Function

Figure 7:
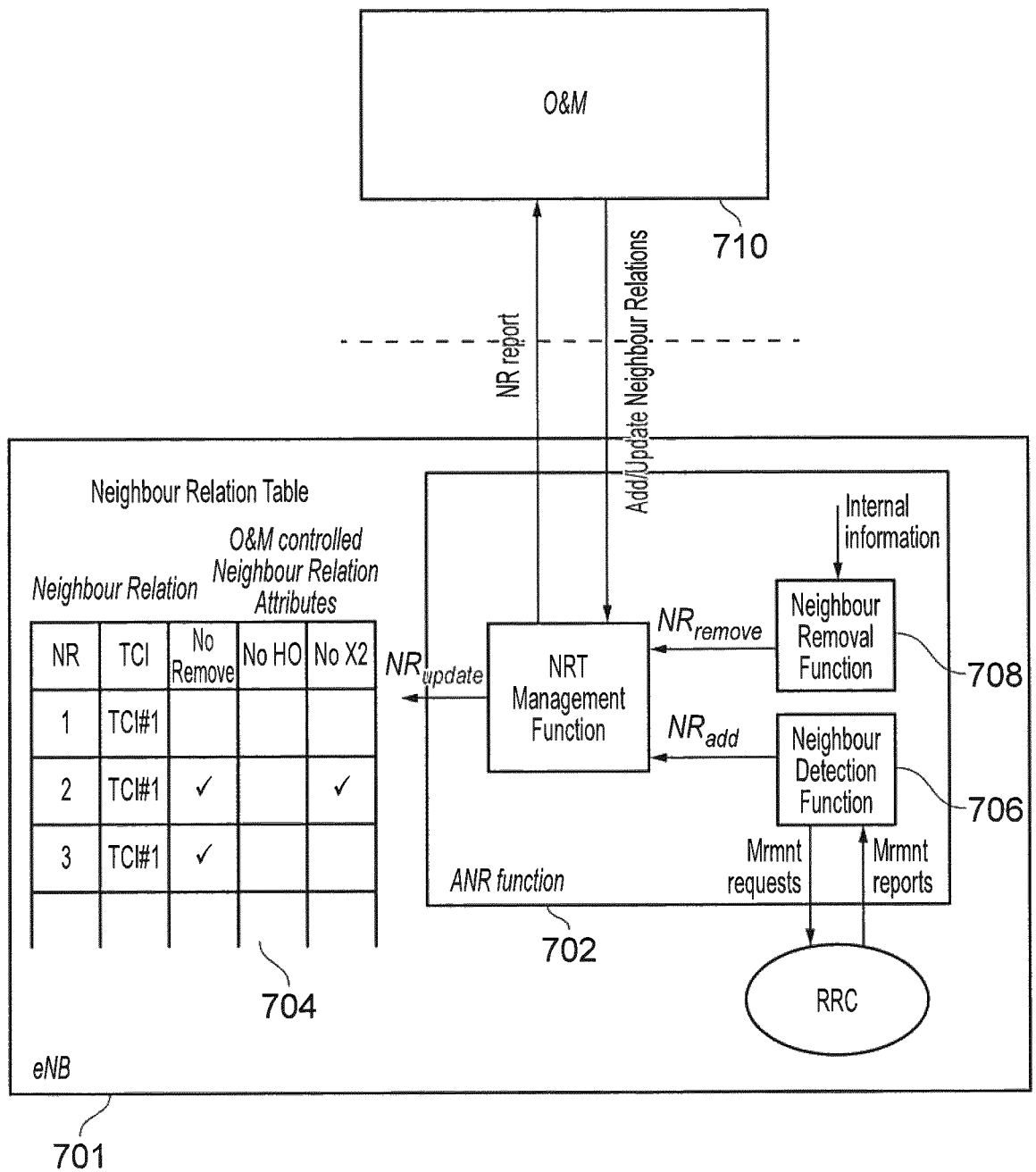
FIG. 7 illustrates the automatic neighbour relation (ANR) function and its environment.
Figure 8:
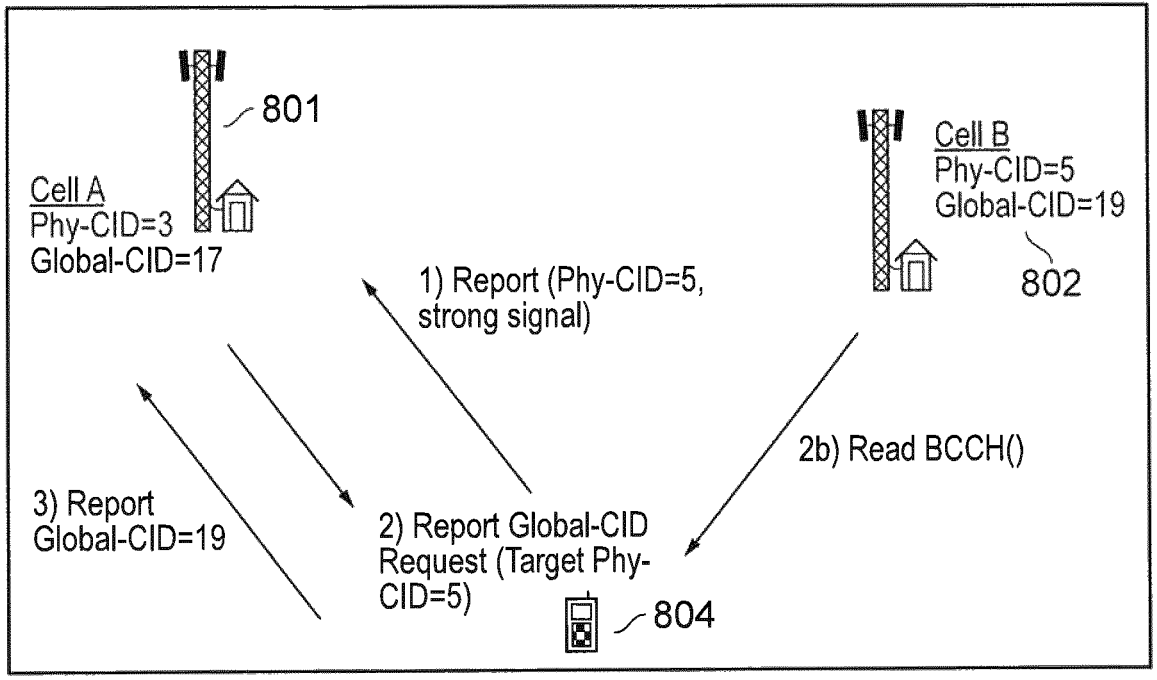
FIG. 8 shows an example describing the intra-LTE/frequency ANR function.
Figure 9:
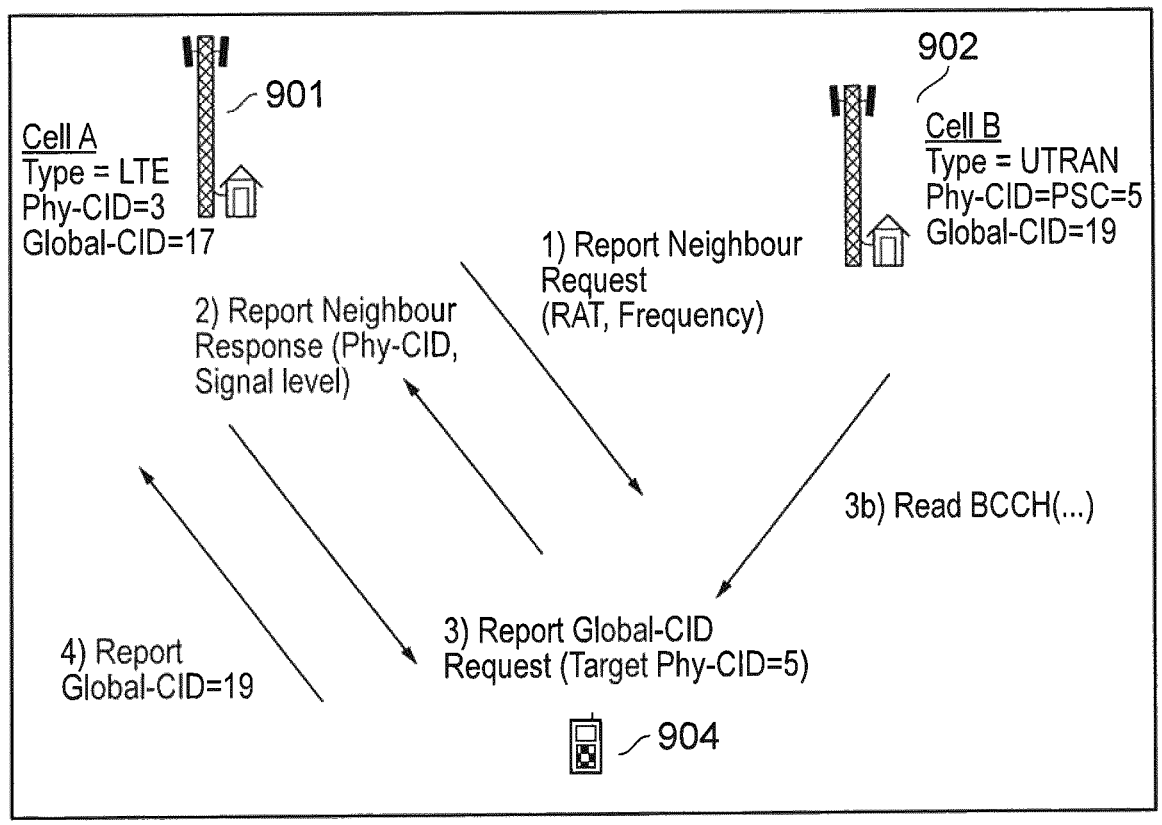
FIG. 9 shows an example describing the inter-RAT/inter-frequency ANR function.

It has been agreed that a cell connected to both 5GC and EPC will broadcast Non-Access Stratum (NAS) parameters related to both CNs. Current automatic neighbour relation (ANR) framework is described below, whereby the UE reports parameters such as Cell Identity (CID), Tracking Area Code (TAC), Location Area Code (LAC), Public Land Mobile Network (PLMN) Identities, and Closed Subscriber Group (CSG) IDs. FIGS. 7, 8 and 9 below, along with much of the associated wording (which has been adapted herein), are taken from [6], and show neighbour cell management.

The purpose of the Automatic Neighbour Relation (ANR) function is to relieve the operator from the burden of manually managing Neighbour Relations (NRs). FIG. 7 shows ANR and its environment. The ANR function 702 resides in the eNB 701 and manages the conceptual Neighbour Relation Table (NRT) 704. Located within ANR 702, the Neighbour Detection Function 706 finds new neighbours and adds them to the NRT 704. ANR 702 also contains the Neighbour Removal Function 708 which removes outdated NRs. The Neighbour Detection Function 706 and the Neighbour Removal Function 708 are implementation specific.

A Neighbour cell Relation (NR) in the context of ANR is defined as follows. An existing Neighbour Relation from a source cell to a target cell means that eNB controlling the source cell:
  a) Knows the ECGI/CGI and PCI of the target cell.
  b) Has an entry in the Neighbour Relation Table for the source cell identifying the target cell.
  c) Has the attributes in this Neighbour Relation Table entry defined, either by O&M or set to default values.

For each cell that the eNB has, the eNB keeps a NRT, as shown in FIG. 7. For each NR, the NRT contains the Target Cell Identifier (TCI), which identifies the target cell. For E-UTRAN, the TCI corresponds to the E-UTAN Cell Global Identifier (ECGI) and Physical Cell Identifier (PCI) of the target cell. Furthermore, each NR has three attributes, the NoRemove, the NoHO and the NoX2 attribute. These attributes have the following definitions:
  No Remove: If checked, the eNB shall not remove the Neighbour cell Relation from the NRT.
  No HO: If checked, the Neighbour cell Relation shall not be used by the eNB for handover reasons.
  No X2: If checked, the Neighbour Relation shall not use an X2 interface in order to initiate procedures towards the eNB parenting the target cell.

Neighbour cell Relations are cell-to-cell relations, and are unidirectional, while an X2 link is set up between two eNBs, and is bidirectional. The neighbour information exchange, which occurs during the X2 Setup procedure or in the eNB Configuration Update procedure, may be used for ANR purposes. As shown in FIG. 7, the ANR function 702 also allows operation and maintenance (O&M) 710 to manage the NRT 704. O&M 710 can add and delete NRs. It can also change the attributes of the NRT 704. The O&M 710 system is informed about changes in the NRT 704.

The ANR (Automatic Neighbour Relation) function relies on cells broadcasting their identity on global level, E-UTRAN Cell Global Identifier (ECGI). The function is illustrated in FIG. 8, and works as follows:

The eNB serving cell A 801 has an ANR function. As a part of the normal call procedure, the eNB instructs each UE to perform measurements on neighbour cells. The eNB may use different policies for instructing the UE to do measurements, and when to report them to the eNB.
  1. The UE 804 sends a measurement report regarding cell B 802. This report contains Cell B's PCI, but not its ECGI.
  2. When the eNB 801 receives a UE 804 measurement report containing the PCI, the following sequence may be used. The eNB 801 instructs the UE 804, using the newly discovered PCI as parameter, to read the ECGI, the TAC and all available PLMN ID(s) of the related neighbour cell 802. To do so, the eNB 801 may need to schedule appropriate idle periods to allow the UE 804 to read the ECGI from the broadcast channel of the detected neighbour cell 802.
  3. When the UE 804 has found out the new cell's ECGI, the UE 804 reports the detected ECGI to the serving cell eNB 801. In addition the UE 804 reports the tracking area code and all PLMN IDs that have been detected. If the detected cell 802 is a CSG or hybrid cell, the UE 804 also reports the CSG ID to the serving cell eNB 801.
  4. The eNB 801 decides to add this neighbour relation, and can use PCI and ECGI to:
     a Lookup a transport layer address to the new eNB 802.
     b Update the Neighbour Relation List.
     c If needed, setup a new X2 interface towards this eNB 802.

The eNB may differentiate the open access HeNB from the other types of (H)eNB by the PCI configuration or ECGI configuration.

For Inter-RAT and Inter-Frequency ANR, each cell contains an Inter Frequency Search list. This list contains all frequencies that shall be searched. For Inter-RAT cells, the NoX2 attribute in the NRT is presently absent, as X2 is currently only defined for E-UTRAN. However, it is expected that the X2 interface could also be defined between an E-UTRAN (LTE) eNodeB and a NR (5G) eNodeB. The function is illustrated in FIG. 9, and works as follows:

The eNB serving cell A 901 has an ANR function. During connected mode, the eNB can instruct a UE to perform measurements and detect cells on other RATs/frequencies. The eNB may use different policies for instructing the UE to do measurements, and when to report them to the eNB.
  1 The eNB 901 instructs a UE 904 to look for neighbour cells in the target RATs/frequencies. To do so the eNB 901 may need to schedule appropriate idle periods to allow the UE 904 to scan all cells in the target RATs/frequencies.
  2 The UE 904 reports the PCI of the detected cells 902 in the target RATs/frequencies. The PCI is defined by the carrier frequency and the Primary Scrambling Code (PSC) in case of UTRAN FDD cell, by the carrier frequency and the cell parameter ID in case of UTRAN TDD cell, by the Band Indicator+BSIC+BCCH ARFCN in case of GERAN cell and by the PN Offset in case of CDMA2000 cell.

3 When the eNB 901 receives UE 904 reports containing PCIs of cell(s) the following sequence may be used. The eNB 901 instructs the UE 904, using the newly discovered PCI as parameter, to read the CGI and the RAC of the detected neighbour cell 902 in case of GERAN detected cells, CGI, LAC, RAC and all broadcasted PLMN-ID(s) in case of UTRAN detected cells and CGI in case of CDMA2000 detected cells. For the inter-frequency case, the eNB 901 instructs the UE 904, using the newly discovered PCI as parameter, to read the ECGI, TAC and all available PLMN ID(s) of the inter-frequency detected cell 902. The UE 904 ignores transmissions from the serving cell 901 while finding the requested information transmitted in the broadcast channel of the detected inter-system/inter-frequency neighbour cell 902. To do so, the eNB 901 may need to schedule appropriate idle periods to allow the UE 904 to read the requested information from the broadcast channel of the detected inter-RAT/inter-frequency neighbour cell 902.

4 After the UE 904 has read the requested information in the new cell 902, it reports the detected CGI and RAC (in case of GERAN detected cells) or CGI, LAC, RAC and all broadcasted PLMN-ID(s) (in case of UTRAN detected cells) or CGI (in case of CDMA2000 detected cells) to the serving cell eNB 901. In the inter-frequency case, the UE 904 reports the ECGI, the, tracking area code and all PLMN-ID(s) that have been detected. If the detected cell 902 is a CSG or hybrid cell, the UE 904 also reports the CSG ID to the serving cell eNB 901.

5 The eNB 901 updates its inter-RAT/inter-frequency Neighbour Relation Table. In the inter-frequency case and if needed, the eNB 901 can use the PCI and ECGI for a new X2 interface setup towards this eNB 902.

In step 3b as shown in FIG. 9, the UE 904 reads neighbouring cell system information in order to acquire the information required to be reported back to the serving cell 901. It is possible that only a few cells under the control of an eNB are connected to 5GC or both core networks and other cells connect only to EPC. This should typically be the case for network sharing whereby the new incumbent operator has 5GC and cells controlled by an eNB represent a mix of coverage (EPC+5GC) and capacity (either 5GC or EPC) or incumbent operator share cells on one frequency only and cells operating on that frequency connect to both 5GC and EPC. Other cells connect only to EPC.

Another case could be a combination of a macro and a small cell (RRH) whereby the RRH is connected to 5GC and EPC but the macro cell is connected to EPC only. These are few examples highlighting the need for maintaining a new entry in the neighbour relationship table for CN connectivity, such that a serving cell is able to make a decision as to whether an S1 or X2 based handover procedure should be triggered for a particular UE. In addition, the serving cell may require such information so as to determine whether an X2 interface needs to be setup towards such a cell.

ANR Enhancement for LTE Cell Connected to 5GC/EPC

Embodiments of the present technique introduce an enhanced ANR mechanism for an LTE cell which is connected to both the EPC and 5GC. In such an enhanced ANR mechanism, the UE reports, based on (for example) an indication broadcasted in the system information, if a neighboring cell has a connection to the 5GC or both CNs. It is stated in [6] that this information can be derived by the UE based on either simply presence of 5GC NAS information in the system information or an explicit indication can be broadcasted in earlier SIBs (MIB, SIB1, and SIB2). Most likely, this would be broadcast in SIB1, as it has NAS information, and the UE gets other SON-ANR related information after reading SIB1.

Figure 10:
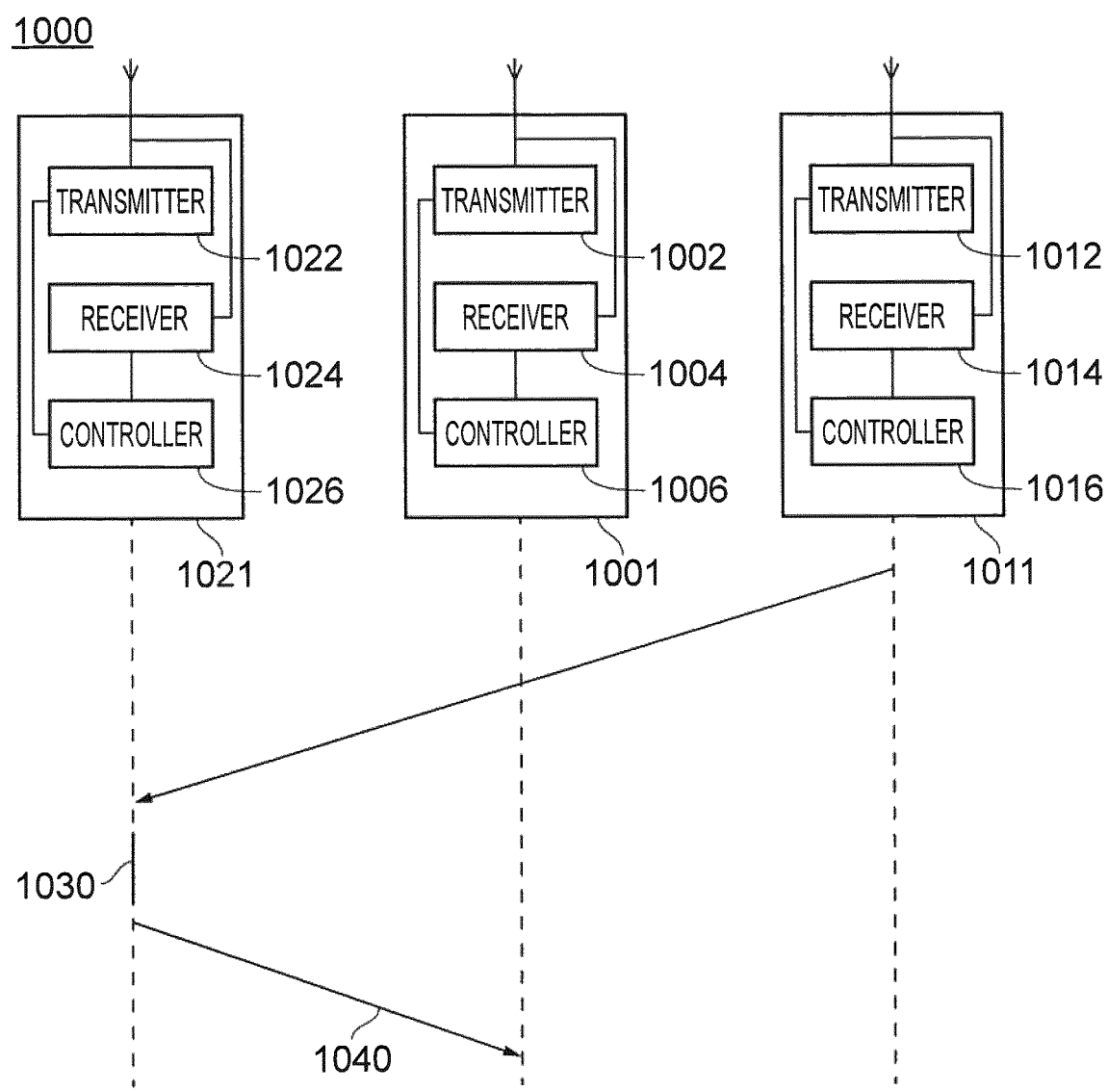
FIG. 10 is a part schematic representation, part message flow diagram of communications between a communications device and an infrastructure equipment of a mobile communications network in accordance with embodiments of the present technique.

A first embodiment of the present technique is described with relation to FIG. 10. FIG. 10 illustrates a method for use in a mobile communications network 1000 comprising a plurality of infrastructure equipment 1001, 1011 each providing wireless connectivity within at least one cell, and a communications device 1021 configured to communicate wirelessly with at least a first of the infrastructure equipment 1001 in control of a first cell. The method comprises determining 1030, at the communications device 1021, whether a second cell under control of a second of the infrastructure equipment 1011 is connected to a first core network operating in accordance with a first communications protocol or both of the first core network and a second core network operating in accordance with a second communications protocol, the second cell being a neighbour of the first cell, and transmitting 1040, by the communications device 1021, an automatic neighbour relation report to the first infrastructure equipment 1001, the automatic neighbour relation report comprising an indication of whether the second cell is connected to the first core network or both of the first core network and the second core network.

Each of the communications device 1021 and the infrastructure equipment 1001, 1011 comprise a transmitter (or transmitter circuitry) 1022, 1002, 1012, a receiver (or receiver circuitry) 1024, 1004, 1014, 1024, and a controller (or controller circuitry) 1026, 1006, 1016. Each of the controllers 1026, 1006, 1016 may be, for example, a microprocessor, a CPU, or a dedicated chipset, etc.

Alternatively or in addition, the X2 setup message may be modified. X2 setup is sent with a new information element (IE) indicating support for 5GC or both EPC and 5GC if the initiating node supports connection to 5GC or both CNs. If the receiving eNodeB is a legacy (LTE only) eNodeB then it won't understand the new IEs, and therefore won't send any new IEs about its own support of 5GC or both CNs. Otherwise, the receiving node will in response send its support for 5GC or both CNs. In other words, in some arrangements of the first embodiment, the method comprises transmitting, by the first infrastructure equipment, a connection setup request message, to the second infrastructure equipment, the connection setup request message comprising an indication of whether the first cell is connected to the first core network or both of the first core network and the second core network. Further, the method may comprise receiving, at the second infrastructure equipment, the connection setup request message, transmitting, by the second infrastructure equipment, based on the connection setup request message, a connection response message comprising an indication of whether the second cell is connected to the first core network or both of the first core network and the second core network. If both of the first cell and the second cell are connected to the first core network or both of the first core network and the second core network, the method may also comprise an interface between the first infrastructure equipment and the second infrastructure equipment.

In some arrangements of the first embodiment, the determination is made by the communications device based on a bit broadcasted by the second infrastructure equipment, the bit indicating whether the second cell is connected to the first core network or both of the first core network and the second core network. Alternatively, the determination is made by the communications device based on non-access stratum system information received from the second infrastructure equipment.

A second embodiment of the present technique, in which the X2 setup message is modified as described above in absence of the ANR enhancement, provides a method for use in a mobile communications network, the mobile communications network comprising a plurality of infrastructure equipment each providing wireless connectivity within at least one cell, and a communications device configured to communicate wirelessly with at least a first of the infrastructure equipment in control of a first cell. The method comprises transmitting, by the first infrastructure equipment, a connection setup request message, to a second of the infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell. In some arrangements of the second embodiment the method comprises receiving, at the second infrastructure equipment, the connection setup request message, transmitting, by the second infrastructure equipment, based on the connection setup request message, a connection response message comprising an indication of whether the second cell is connected to the first core network or both of the first core network and the second core network. If both of the first cell and the second cell are connected to the first core network or both of the first core network and the second core network, the method may also comprise forming an interface between the first infrastructure equipment and the second infrastructure equipment.

It may be questionable if the X2 interface is needed between two nodes having 5GC to EPC or vice versa handover, as a change of core network will need to involve the core network. Only data forwarding can be done via X2 in such cases and termination points can be shared via existing S1 messages and should already be possible. However, the X2 interface is setup for all the cells controlled by the eNodeB and as mentioned above, only a few cells may require knowledge about CN connectivity in the target cell, and the X2 interface may exist for other legacy cells connected to EPC only or 5GC only. The below table lays out the various scenarios in terms of CN connectivity of source and target cells, and the type of handover therefore which will be performed. In addition, Table I below defines whether a new ANR enhancement will be needed in each of the scenarios.

TABLE I

| Source cell connectivity | Target cell connectivity | Type of handover | New ANR enhancement needed? |
|---|---|---|---|
| EPC | EPC | X2 if present | No |
| EPC | 5GC | S1 as change of CN is required | Yes, to distinguish from the case above |
| EPC | 5GC + EPC | X2 if present | No, handover will be EPC-EPC first |
| 5GC | EPC | S1 | Yes, inter CN handover. If SON-ANR report is not enhanced for reporting connection to EPC then it implies connection to EPC. |
| 5GC | 5GC | X2 | Yes, if absence of enhanced reporting implies connection to EPC then we need explicit signaling to identify connection to 5GC |
| EPC + 5GC | 5GC | S1 or X2 depending on source side UE connection | Yes, if absence of enhanced reporting implies connection to EPC then we need explicit signaling to identify connection to 5GC |
| EPC + 5GC | EPC + 5GC | S1 or X2 depending on source side UE connection | Yes, if absence of enhanced reporting implies connection to EPC then we need explicit signaling to identify connection to 5GC |

Embodiments of the present technique may therefore provide ways in which source cells may determine whether target cells for handover support connection to the NR core network. Specifically to the first embodiment of the present technique, the ANR mechanism is enhanced to support reporting of a target cell connectivity to 5GC or both CNs.

The following numbered paragraphs provide further example aspects and features of the present technique:

Paragraph 1. A method for use in a mobile communications network, the mobile communications network comprising a plurality of infrastructure equipment each providing wireless connectivity within at least one cell, and a communications device configured to communicate wirelessly with at least a first of the infrastructure equipment in control of a first cell, wherein the method comprises determining, at the communications device, whether a second cell under control of a second of the infrastructure equipment is connected to a first core network operating in accordance with a first communications protocol or both of the first core network and a second core network operating in accordance with a second communications protocol, the second cell being a neighbour of the first cell, and transmitting, by the communications device, an automatic neighbour relation report to the first infrastructure equipment, the automatic neighbour relation report comprising an indication of whether the second cell is connected to the first core network or both of the first core network and the second core network.

Paragraph 2. A method according to Paragraph 1, wherein the method comprises transmitting, by the first infrastructure equipment, a connection setup request message, to the second infrastructure equipment, the connection setup request message comprising an indication of whether the first cell is connected to the first core network or both of the first core network and the second core network.

Paragraph 3. A method according to Paragraph 2, wherein the method comprises receiving, at the second infrastructure equipment, the connection setup request message, and transmitting, by the second infrastructure equipment, based on the connection setup request message, a connection response message comprising an indication of whether the second cell is connected to the first core network or both of the first core network and the second core network.

Paragraph 4. A method according to Paragraph 3, wherein the method comprises, if both of the first cell and the second cell are connected to the first core network or both of the first core network and the second core network, forming an interface between the first infrastructure equipment and the second infrastructure equipment.

Paragraph 5. A method according to any of Paragraphs 1 to 4, wherein the determination is made by the communications device based on a bit broadcasted by the second infrastructure equipment, the bit indicating whether the second cell is connected to the first core network or both of the first core network and the second core network.

Paragraph 6. A method according to any of Paragraphs 1 to 4, wherein the determination is made by the communications device based on non-access stratum system information received from the second infrastructure equipment.

Paragraph 7. A mobile communications network comprising a plurality of infrastructure equipment each providing wireless connectivity within at least one cell, and a communications device configured to communicate wirelessly with at least a first of the infrastructure equipment in control of a first cell, wherein the communications device is configured to determine whether a second cell under control of a second of the infrastructure equipment is connected to a first core network of a first communications protocol or both of the first core network and a second core network of a second communications protocol, the second cell being a neighbour of the first cell, and to transmit an automatic neighbour relation report to the first infrastructure equipment, the automatic neighbour relation report comprising an indication of whether the second cell is connected to the first core network or both of the first core network and the second core network.

Paragraph 8. Circuitry for a mobile communications network comprising a plurality of infrastructure equipment each providing wireless connectivity within at least one cell, and a communications device configured to communicate wirelessly with at least a first of the infrastructure equipment in control of a first cell, wherein the communications device is configured to determine whether a second cell under control of a second of the infrastructure equipment is connected to a first core network operating in accordance with a first communications protocol or both of the first core network and a second core network operating in accordance with a second communications protocol, the second cell being a neighbour of the first cell, and to transmit an automatic neighbour relation report to the first infrastructure equipment, the automatic neighbour relation report comprising an indication of whether the second cell is connected to the first core network or both of the first core network and the second core network.

Paragraph 9. A communications device for use in a mobile communications network, the mobile communications network comprising a plurality of infrastructure equipment each providing wireless connectivity within at least one cell, wherein the communications device comprises transmitter circuitry configured to transmit signals to the infrastructure equipment, receiver circuitry configured to receive signals from the infrastructure equipment, and controller circuitry configured to control the transmitter circuitry and the receiver circuitry to communicate wirelessly with at least a first of the infrastructure equipment in control of a first cell, to determine whether a second cell under control of a second of the infrastructure equipment is connected to a first core network operating in accordance with a first communications protocol or both of the first core network and a second core network operating in accordance with a second communications protocol, the second cell being a neighbour of the first cell, and to transmit an automatic neighbour relation report to the first infrastructure equipment, the automatic neighbour relation report comprising an indication of whether the second cell is connected to the first core network or both of the first core network and the second core network.

Paragraph 10. A method of operating a communications device for use in a mobile communications network, the mobile communications network comprising a plurality of infrastructure equipment each providing wireless connectivity within at least one cell, wherein the method comprises communicating wirelessly with at least a first of the infrastructure equipment in control of a first cell, determining whether a second cell under control of a second of the infrastructure equipment is connected to a first core network operating in accordance with a first communications protocol or both of the first core network and a second core network operating in accordance with a second communications protocol, the second cell being a neighbour of the first cell, and transmitting an automatic neighbour relation report to the first infrastructure equipment, the automatic neighbour relation report comprising an indication of whether the second cell is connected to the first core network or both of the first core network and the second core network.

Paragraph 11. Circuitry for a communications device for use in a mobile communications network, the mobile communications network comprising a plurality of infrastructure equipment each providing wireless connectivity within at least one cell, wherein the communications device comprises transmitter circuitry configured to transmit signals to the infrastructure equipment, receiver circuitry configured to receive signals from the infrastructure equipment, and controller circuitry configured to control the transmitter circuitry and the receiver circuitry to communicate wirelessly with at least a first of the infrastructure equipment in control of a first cell, to determine whether a second cell under control of a second of the infrastructure equipment is connected to a first core network operating in accordance with a first communications protocol or both of the first core network and a second core network operating in accordance with a second communications protocol, the second cell being a neighbour of the first cell, and to transmit an automatic neighbour relation report to the first infrastructure equipment, the automatic neighbour relation report comprising an indication of whether the second cell is connected to the first core network or both of the first core network and the second core network.

Paragraph 12. An infrastructure equipment for use in a mobile communications network, the mobile communications network comprising one or more other infrastructure equipment, the infrastructure equipment and one or more other infrastructure equipment each providing wireless connectivity within at least one cell, and a communications device configured to communicate wirelessly with at least the infrastructure equipment, wherein the infrastructure equipment is in control of a first cell and comprises transmitter circuitry configured to transmit signals to the communications device and the other infrastructure equipment, receiver circuitry configured to receive signals from the communications device and the other infrastructure equipment, and controller circuitry configured to control the transmitter circuitry and the receiver circuitry to receive an automatic neighbour relation report from the communications device, the automatic neighbour relation report comprising an indication of whether a second cell under control of one of the other infrastructure equipment is connected to a first core network operating in accordance with a first communications protocol or both of the first core network and a second core network operating in accordance with a second communications protocol, the second cell being a neighbour of the first cell.

Paragraph 13. A method of operating an infrastructure equipment for use in a mobile communications network, the mobile communications network comprising one or more other infrastructure equipment, the infrastructure equipment and other infrastructure equipment each providing wireless connectivity within at least one cell, and a communications device configured to communicate wirelessly with at least the infrastructure equipment, wherein the infrastructure equipment is in control of a first cell, the method comprising receiving an automatic neighbour relation report from the communications device, the automatic neighbour relation report comprising an indication of whether a second cell under control of one of the other infrastructure equipment is connected to a first core network operating in accordance with a first communications protocol or both of the first core network and a second core network operating in accordance with a second communications protocol, the second cell being a neighbour of the first cell.

Paragraph 14. Circuitry for an infrastructure equipment for use in a mobile communications network, the mobile communications network comprising one or more other infrastructure equipment, the infrastructure equipment and one or more other infrastructure equipment each providing wireless connectivity within at least one cell, and a communications device configured to communicate wirelessly with at least the infrastructure equipment, wherein the infrastructure equipment is in control of a first cell and comprises transmitter circuitry configured to transmit signals to the communications device and the other infrastructure equipment, receiver circuitry configured to receive signals from the communications device and the other infrastructure equipment, and controller circuitry configured to control the transmitter circuitry and the receiver circuitry to receive an automatic neighbour relation report from the communications device, the automatic neighbour relation report comprising an indication of whether a second cell under control of one of the other infrastructure equipment is connected to a first core network operating in accordance with a first communications protocol or both of the first core network and a second core network operating in accordance with a second communications protocol, the second cell being a neighbour of the first cell.

Paragraph 15. A method for use in a mobile communications network, the mobile communications network comprising a plurality of infrastructure equipment each providing wireless connectivity within at least one cell, and a communications device configured to communicate wirelessly with at least a first of the infrastructure equipment in control of a first cell, wherein the method comprises transmitting, by the first infrastructure equipment, a connection setup request message, to a second of the infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Paragraph 16. A method according to Paragraph 15, wherein the method comprises receiving, at the second infrastructure equipment, the connection setup request message, transmitting, by the second infrastructure equipment, based on the connection setup request message, a connection response message comprising an indication of whether the second cell is connected to the first core network or both of the first core network and the second core network.

Paragraph 17. A method according to Paragraph 16, wherein the method comprises, if both of the first cell and the second cell are connected to the first core network or both of the first core network and the second core network, forming an interface between the first infrastructure equipment and the second infrastructure equipment.

Paragraph 18. A mobile communications network comprising a plurality of infrastructure equipment each providing wireless connectivity within at least one cell, and a communications device configured to communicate wirelessly with at least a first of the infrastructure equipment in control of a first cell, wherein the first infrastructure equipment is configured to transmit a connection setup request message to a second of the infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Paragraph 19. Circuitry for a mobile communications network comprising a plurality of infrastructure equipment each providing wireless connectivity within at least one cell, and a communications device configured to communicate wirelessly with at least a first of the infrastructure equipment in control of a first cell, wherein the first infrastructure equipment is configured to transmit a connection setup request message to a second of the infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Paragraph 20. An infrastructure equipment for use in a mobile communications network, the mobile communications network comprising one or more other infrastructure equipment, the infrastructure equipment and other infrastructure equipment each providing wireless connectivity within at least one cell, wherein the infrastructure equipment is in control of a first cell and comprises transmitter circuitry configured to transmit signals to the other infrastructure equipment, receiver circuitry configured to receive signals from the other infrastructure equipment, and controller circuitry configured to control the transmitter circuitry and the receiver circuitry to transmit a connection setup request message to one of the other infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Paragraph 21. A method of operating an infrastructure equipment for use in a mobile communications network, the mobile communications network comprising one or more other infrastructure equipment, the infrastructure equipment and other infrastructure equipment each providing wireless connectivity within at least one cell, wherein the infrastructure equipment is in control of a first cell, the method comprising transmitting a connection setup request message to one of the other infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Paragraph 22. Circuitry for an infrastructure equipment for use in a mobile communications network, the mobile communications network comprising one or more other infrastructure equipment, the infrastructure equipment and other infrastructure equipment each providing wireless connectivity within at least one cell, wherein the infrastructure equipment is in control of a first cell and comprises transmitter circuitry configured to transmit signals to the other infrastructure equipment, receiver circuitry configured to receive signals from the other infrastructure equipment, and controller circuitry configured to control the transmitter circuitry and the receiver circuitry to transmit a connection setup request message to one of the other infrastructure equipment in control of a second cell, the connection setup request message comprising an indication of whether the first cell is connected to a first core network operating in accordance with a first communications protocol or both of the first core network and a second core network operating in accordance with a second communications protocol, the second cell being a neighbour of the first cell.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160671, "New SID Proposal: Study on New Radio Access Technology," NTT DOCOMO, RAN #71.
[4] R1-1611681, "Coexistence between NR and LTE," Huawei, HiSilicon, RAN1#87.
[5] RP-170840, "New Work item on LTE connectivity to 5G-CN," Huawei, Ericsson, RAN #75.
[6] 3GPP Specification 36.300, "Evolved Universal Terrestrial Radio Access (E-UTRA) and Evolved Universal Terrestrial Radio Access Network (E-UTRAN); Overall description; Stage 2," $3^{rd}$ Generation Partnership Project.

What is claimed is:

1. A method for use in a mobile communications network, the mobile communications network comprising
  a plurality of infrastructure equipment each providing wireless connectivity within at least one cell, and
  a communications device configured to communicate wirelessly with at least a first of the infrastructure equipment in control of a first cell, wherein the method comprises
  determining, at the communications device, whether a second cell under control of a second of the infrastructure equipment is connected to a first core network operating in accordance with a first communications protocol, a second core network operating in accordance with a second communications protocol, or both of the first core network and a second core network, the second cell being a neighbour of the first cell,
  transmitting, by the communications device, an automatic neighbour relation report to the first infrastructure equipment, the automatic neighbour relation report comprising an indication of whether the second cell is connected to the first core network, the second core network, or both of the first core network and the second core network,
  initiating a handover of the communications device from the first infrastructure equipment to the second infrastructure equipment using an X2 interface between the first infrastructure equipment and the second infrastructure equipment upon determining both of the first cell and the second cell are connected to the same core networks,
  initiating a handover of the communications device from the first infrastructure equipment to the second infrastructure equipment using an S1 interface between the first infrastructure equipment and a core network upon determining the first cell and the second cell are connected to different core networks operating in accordance with different communication protocols, and
  initiating a handover of the communications device from the first infrastructure equipment to the second infrastructure equipment using an X2 interface between the first infrastructure equipment and the second infrastructure equipment upon determining the first cell and the second cell are connected to different core networks operating, in accordance with the same communications protocol.

2. A method according to claim 1, wherein the method comprises
  transmitting, by the first infrastructure equipment, a connection setup request message, to the second infrastructure equipment, the connection setup request message comprising an indication of whether the first cell is connected to the first core network or both of the first core network and the second core network.

3. A method according to claim 2, wherein the method comprises
  receiving, at the second infrastructure equipment, the connection setup request message, and
  transmitting, by the second infrastructure equipment, based on the connection setup request message, a connection response message comprising an indication of whether the second cell is connected to the first core network or both of the first core network and the second core network.

4. A method according to claim 3, wherein the method comprises, if both of the first cell and the second cell are connected to the first core network or both of the first core network and the second core network,
  forming an interface between the first infrastructure equipment and the second infrastructure equipment.

5. A method according to claim 1, wherein the determination is made by the communications device based on a bit broadcasted by the second infrastructure equipment, the bit indicating whether the second cell is connected to the first core network or both of the first core network and the second core network.

6. A method according to claim 1, wherein the determination is made by the communications device based on non-access stratum system information received from the second infrastructure equipment.

7. A communications device for use in a mobile communications network, the mobile communications network comprising a plurality of infrastructure equipment each providing wireless connectivity within at least one cell, wherein the communications device comprises
  transmitter circuitry configured to transmit signals to the infrastructure equipment,
  receiver circuitry configured to receive signals from the infrastructure equipment, and
  controller circuitry configured to control the transmitter circuitry and the receiver circuitry
  to communicate wirelessly with at least a first of the infrastructure equipment in control of a first cell,
  to determine whether a second cell under control of a second of the infrastructure equipment is connected to a first core network operating in accordance with a first communications protocol, a second core network operating in accordance with a second communications protocol, or both of the first core network and a second core network, the second cell being a neighbour of the first cell,
  to transmit an automatic neighbour relation report to the first infrastructure equipment, the automatic neighbour relation report comprising an indication of whether the second cell is connected to the first core network, the second core network, or both of the first core network and the second core network,
  to initiate a handover of the communications device from the first infrastructure equipment to the second infrastructure equipment using an X2 interface between the first infrastructure equipment and the second infrastructure equipment upon determining both of the first cell and the second cell are connected to the same core networks,
  to initiate a handover of the communications device from the first infrastructure equipment to the second infrastructure equipment using an S1 interface between the first infrastructure equipment and a core network upon determining the first cell and the second cell are connected to different core networks operating in accordance with different communication protocols, and to initiate a handover of the communications device from the first infrastructure equipment to the second infrastructure equipment using an X2 interface between the first infrastructure equipment and the second infrastructure equipment upon determining the first cell and the second cell are connected to different core networks operating in accordance with the same communications protocol.

8. An infrastructure equipment for use in a mobile communications network, the mobile communications network comprising one or more other infrastructure equipment, the infrastructure equipment and one or more other infrastructure equipment each providing wireless connectivity within at least one cell, and a communications device configured to communicate Wirelessly with at least the infrastructure equipment, wherein the infrastructure equipment is in control of a first cell and comprises transmitter circuitry configured to transmit signals to the communications device and the other infrastructure equipment, receiver circuitry configured to receive signals from the communications device and the other infrastructure equipment, controller circuitry configured to control the transmitter circuitry and the receiver circuitry to receive an automatic neighbour relation report from the communications device, the automatic neighbour relation report comprising an indication of whether a second cell under control of one of the other infrastructure equipment is connected to a first core network operating in accordance with a first communications protocol, a second core network operating in accordance with a second communications protocol, or both of the first core network and a second core network, the second cell being a neighbour of the first cell, to initiate a handover of the communications device to the other infrastructure equipment using an X2 interface with the other infrastructure equipment upon determining both of the first cell and the second cell are connected to the same core networks, to initiate a handover of the communications device to the other infrastructure equipment using an S1 interface with a core network upon determining the first cell and the second cell are connected to different core networks operating in accordance with different communication protocols, and.

to initiate a handover of the communications device to the other infrastructure equipment using an X2 interface with the other infrastructure equipment upon determining the first cell and the second cell are connected to different core networks operating in accordance with the same communications protocol.

9. An infrastructure equipment for use in a mobile communications network, the mobile communications network comprising one or more other infrastructure equipment, the infrastructure equipment and other infrastructure equipment each providing wireless connectivity within at least one cell, wherein the infrastructure equipment is in control of a first cell and comprises transmitter circuitry configured to transmit signals to the other infrastructure equipment, receiver circuitry configured to receive signals from the other infrastructure equipment, controller circuitry configured to control the transmitter circuitry and the receiver circuitry to transmit a connection setup request message to one of the other infrastructure equipment in control of a second cell, the connection setup request message comprising an indication of whether the first cell is connected to a first core network operating in accordance with a first communications protocol, a second core network operating in accordance with a second communications protocol, or both of the first core network and a second core network, the second cell being a neighbour of the first cell, to initiate a handover of a communications device to the other infrastructure equipment using an X2 interface with the other infrastructure equipment upon determining both of the first cell and the second cell are connected to the same core networks, to initiate a handover of the communications device to the other infrastructure equipment using an S1 interface with a core network upon determining the first cell and the second cell are connected to different core networks operating in accordance with different communication protocols, and to initiate a handover of the communications device to the other infrastructure equipment using an X2 interface with the other infrastructure equipment upon determining the first cell and the second cell are connected to different core networks operating in accordance with the same communications protocol.

* * * * *